(12) United States Patent
Hertzman et al.

(10) Patent No.: US 7,443,495 B2
(45) Date of Patent: Oct. 28, 2008

(54) SURVEYING INSTRUMENT AND SURVEYING METHOD

(75) Inventors: Mikael Hertzman, Sollentuna (SE); Thomas Klang, Akersberga (SE); Mikael Nordenfelt, Taeby (SE)

(73) Assignee: Trimble AB, Danderyd (SE)

( * ) Notice: Subject to any disclaimer, the term of this patent is extended or adjusted under 35 U.S.C. 154(b) by 0 days.

(21) Appl. No.: 11/565,758

(22) Filed: Dec. 1, 2006

(65) Prior Publication Data

US 2007/0127013 A1   Jun. 7, 2007

Related U.S. Application Data

(60) Provisional application No. 60/742,198, filed on Dec. 2, 2005.

(51) Int. Cl.
*G01B 11/26* (2006.01)

(52) U.S. Cl. .................................. 356/139.04

(58) Field of Classification Search ............ 356/139.04, 356/3.01–3.15, 4.01–4.1, 5.01–5.15, 6–22, 356/28, 28.5, 139.01–139.1
See application file for complete search history.

(56) References Cited

U.S. PATENT DOCUMENTS

| 4,717,251 A | 1/1988 | Wells et al. | |
| 2005/0099637 A1* | 5/2005 | Kacyra et al. | 356/601 |

FOREIGN PATENT DOCUMENTS

JP    62254007    11/1987

\* cited by examiner

*Primary Examiner*—Thomas H. Tarcza
*Assistant Examiner*—Luke D Ratcliffe
(74) *Attorney, Agent, or Firm*—Dinsmore & Shohl LLP

(57) ABSTRACT

A surveying instrument and method determine a duration of a measuring period for obtaining readings of angle values of an angle measuring system in dependence of readings of an error signal produced by a tracking system. It is thus possible to determine a value of the angle represented by the readings of the angle signal with a desired accuracy in the presence of air turbulence wherein the measuring period is shorter at low degrees of air turbulence and longer at higher degrees of air turbulence.

30 Claims, 4 Drawing Sheets

SURVEYING INSTRUMENT AND SURVEYING METHOD

CROSS-REFERENCE TO RELATED APPLICATIONS

This application claims the benefit of U.S. Provisional Application Ser. No. 60/742,198 filed Dec. 2, 2005.

BACKGROUND OF THE INVENTION

1. Field of the Invention

The present invention generally relates to a surveying instrument and a surveying method. The invention also relates to a computer program product causing the surveying instrument to perform the surveying method.

2. Brief Description of Related Art

A conventional surveying instrument comprises a base which can be mounted on a tripod and an optical system which is rotatably mounted relative to the base, wherein angle sensors are provided for measuring an orientation of the optical system relative to the base. The optical system may define an aiming direction which may coincide with an optical axis of the optical system or may be defined by a reticle provided in a beam path of the optical system. An operator may look through the optical system and orient the optical system such that the aiming direction is towards a target of interest. The operator may then perform a measurement of an angle of the direction to the target in a suitably chosen coordinate system of the surveying instrument.

The surveying instrument may have a tracking function wherein motors for controlling the orientation of the optical system relative to the base are controlled in dependence of an error signal which is indicative of a difference between the aiming direction of the optical system and the direction towards the target. For this purpose, the optical system may comprise a light source for generating a shaped beam of measuring light defining the aiming direction of the optical system, and a position sensitive radiation detector, such as a four quadrant detector, a position sensing detector or a CCD detector, receiving measuring light reflected from a reflecting target. The tracking system controls the motors such that an error signal derived from a detector signal of the radiation detector is minimized. Plural readings of angle values from the angle sensors are accumulated during a measuring period in which the tracking system maintains the orientation of the optical system such that the aiming direction of the optical system intersects with the target. The plural readings of angle values obtained during the measuring period are then averaged to produce an angle value indicative of the angle of the target in the coordinate system.

Turbulences in an air volume traversed by the beam of measuring light may cause deviations of a beam path of the beam of measuring light from a straight line, resulting in fluctuations of the tracking error signals. Due to the tracking control of the tracking system, the motors are continuously controlled in view of minimizing the error signal. This results in fluctuations of the angle values obtained during the measuring period. For obtaining a sufficient measuring accuracy it is necessary to accumulate a sufficient number of angle value readings which are averaged to determine the measuring result. Therefore, the measuring period must have a substantial duration, such as ten seconds or more, to ensure that a desired measuring accuracy is achieved in situations of high air turbulence. This results in a long duration of a measuring campaign in which measurements of many targets of interest are made.

SUMMARY OF THE INVENTION

The present invention has been accomplished taking the above problems into consideration.

Embodiments of the present invention provide a surveying method for determining an orientation relative to a target, wherein a measuring period is terminated based on readings of an error signal produced by a tracking system of a surveying instrument.

The readings of the error signal obtained during the measuring period can be repeatedly obtained at regular time intervals or irregular time intervals which are determined while performing the method, for example in dependence upon a workload of a processing unit controlling the measurement.

According to an embodiment of the present invention, the terminating of the measuring period comprises determining a variability of error signal values of the plurality of readings of the error signal obtained during the measuring period. For example, a standard error of the error signal values may be determined and used as the variability.

According to an exemplary embodiment, the measuring period is terminated when the variability is below a predetermined threshold. According to an exemplary embodiment herein, the predetermined threshold can be set by a user.

Further embodiments of the present invention provide a surveying method for determining an orientation relative to a target, wherein a measuring period is terminated based on readings of an angle signal produced by an angle measuring system of a surveying instrument. The plural readings of the angle signal may be obtained at regular time intervals within the measuring period or at irregular time intervals.

According to an embodiment, the orientation is determined by averaging angle signal values of the plurality of readings of the angle signal obtained during the measuring period.

According to an exemplary embodiment, the termination of the measuring period may be determined in dependence upon both a plurality of readings of the error signal and a plurality of readings of the angle signal.

A surveying instrument according to an embodiment of the present invention comprises a processing unit configured to cause the surveying instrument to perform the surveying method illustrated above.

According to an exemplary embodiment of the present invention, a surveying instrument comprises: a base; an optical system rotatably mounted relative to the base; at least one motor for controlling an orientation of the optical system relative to the base; an angle measuring system for measuring the orientation of the optical system relative to the base; a tracking system for controlling the at least one motor such that the optical system is directed to a target; and a processing unit configured to repeatedly obtain readings of an angle signal produced by the angle measuring system during a measuring period, to repeatedly obtain readings of an error signal produced by the tracking system during the measuring period, to terminate the measuring period based on a plurality of readings of the error signal obtained during the measuring period, and to calculate an angle value based on a plurality of readings of the angle signal obtained during the measuring period.

According to an exemplary embodiment of the present invention, a surveying instrument comprises: a base; an optical system rotatably mounted relative to the base; at least one motor for controlling an orientation of the optical system relative to the base; an angle measuring system for measuring the orientation of the optical system relative to the base; a tracking system for controlling the at least one motor such that the optical system is directed to a target; and a processing unit configured to repeatedly obtain readings of an angle signal produced by the angle measuring system during a measuring period, to terminate the measuring period based on a plurality of readings of the angle signal obtained during the measuring period, and to calculate an angle value based on a plurality of readings of the angle signal obtained during the measuring period.

According to a further exemplary embodiment, the surveying instrument comprises a position sensitive radiation detector. The position sensitive radiation detector may generate a detection signal which is indicative of an alignment of an aiming direction of an optical system of the surveying instrument with a suitable target. For example, the position sensitive radiation detector may comprise a four sector detector having four detector elements arranged as sectors of a circle.

According to an exemplary embodiment herein, the error signal may be generated based on an output signal of the position sensitive detector, and, according to a further exemplary embodiment, the tracking system may control the at least one motor based on the output signal of the position sensitive detector.

According to a further exemplary embodiment, the optical system may comprise a light source and at least one lens for generating a shaped beam of light emitted from the optical system and defining the aiming direction of the optical system. The tracking system may then control the at least one motor such that the shaped beam of light is directed to the target.

According to an exemplary embodiment, the optical system is rotatable about two axes relative to the target, and a separate motor may be associated with each of the two axes for controlling the orientation of the optical system relative to the base. Advantageously, the two axes are orthogonal to each other.

According to a further exemplary embodiment, the optical system may comprise a distance measuring system for measuring a distance from the target. According to an exemplary embodiment herein, the end of the measuring period may be further determined based on at least one reading of a distance signal produced by the distance measuring system. For example, the value of a threshold for determining the end of the measuring period based on the readings of the error signal can be set lower for greater distances since an influence of air turbulences can be expected to be higher when greater distances are measured.

According to a further embodiment, the invention provides a computer readable carrier containing information representing a computer program adapted to cause a processing unit of a surveying instrument to execute the surveying method as illustrated above. The computer readable carrier can be any suitable type of carrier such as a solid state memory, a magnetic memory, optical memory, other type of memory or modulated waves/signals (e.g. radiofrequency, audio-frequency or optical frequency modulated waves/signals) suitable for being through any suitable network, such as the internet.

BRIEF DESCRIPTION OF DRAWINGS

The foregoing as well as other advantageous features of the invention will be more apparent from the following detailed description of exemplary embodiments of the invention with reference to the accompanying drawings. It is noted that not all possible embodiments of the present invention necessarily exhibit each and every, or any, of the advantages identified herein.

DETAILED DESCRIPTION OF EXEMPLARY EMBODIMENTS

Figure 1:
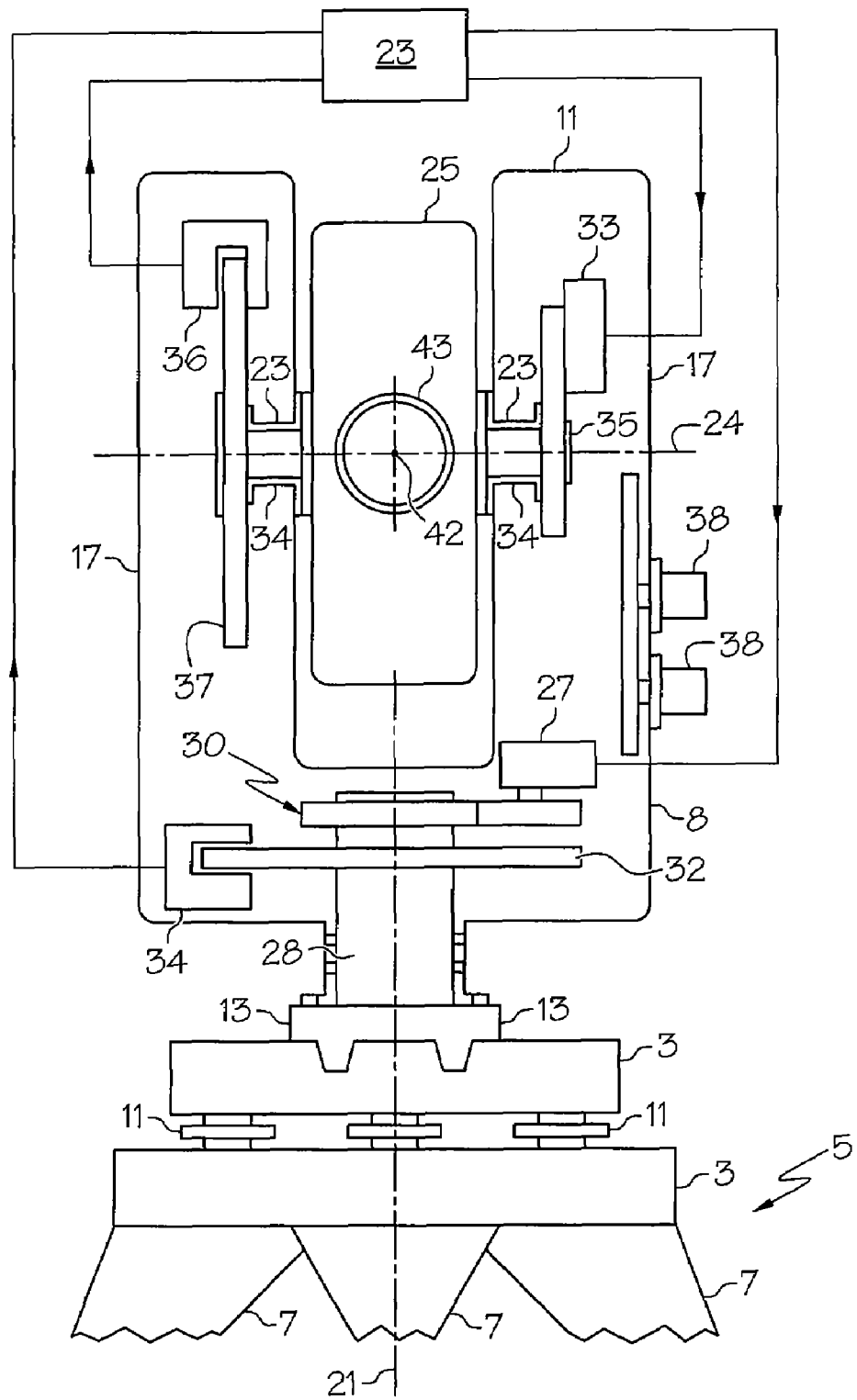
FIG. 1 illustrates a surveying instrument according to an embodiment of the invention.

In the exemplary embodiments described below, components that are alike in function and structure are designated as far as possible by alike reference numerals. Therefore, to understand the features of the individual components of a specific embodiment, the descriptions of other embodiments and of the summary of the invention should be referred to.

FIG. 1 is an illustration of a surveying instrument which may be used according to embodiments of the invention. The surveying instrument 1 is a tacheometer or total station mounted on a tribrach 3 of a tripod 5. The tripod 5 comprises three legs 7 attached to a plate 9. The tribrach 3 comprises three screws 11 allowing leveling of the total station relative to a ground on which the legs are placed.

The surveying instrument 1 has a base 13 attached to the platform 3 in a predetermined and reproducible position by a positioning mechanism comprising such as cone-shaped projections 15 received in corresponding recessions provided in the tribrach 3 and fixed to the tribrach 3 by a fixing mechanism (not shown in FIG. 1).

The base 13 carries a swivel arrangement comprising a pair of brackets 17 mounted on the base 13 by a bearing arrangement 19 such that the pair of brackets 17 is rotatable relative to the base 13 and tribrach 3 about a vertical axis 21. A bearing 23 is provided in each of the brackets 17 to define a common horizontal axis 24 about which an optical measuring system 25 is rotatable.

A motor arrangement 27 carried by the brackets 17 engages with a pin 28 fixed to the base 13 through a gear train 30 for rotating the optical system 25 about the vertical axis 21 by actuation of the motor arrangement 27 controlled by a processing unit 29 of the surveying instrument 1.

An orientation of the measuring system 25 about the vertical axis 21 is detected by a sensor 31 reading an angular position relative to an encoder disk 32 fixed to the pin 28. Angle signals generated by the sensor 31 are supplied to the processing unit 29.

A motor arrangement 33 carried by the brackets 17 engages with an axis 34 of the optical measuring system 25 through a gear train 35 for rotating the measuring system 25 about the horizontal axis 24 by actuation of the motor arrangement 33 controlled by the processing unit 29.

An orientation of the measuring system 25 about the horizontal axis 24 is detected by a sensor 36 reading an angular position relative to an encoder disk 37 fixed to the axis 34. Angle signals generated by the sensor 36 are supplied to the processing unit 29.

Control knobs 38 operable by a user are provided on an outer surface of one of the brackets 17 for instructing the processing unit 29 to perform swivel movements of the optical system 25 about the vertical and horizontal axes 21, 24.

Figure 2:
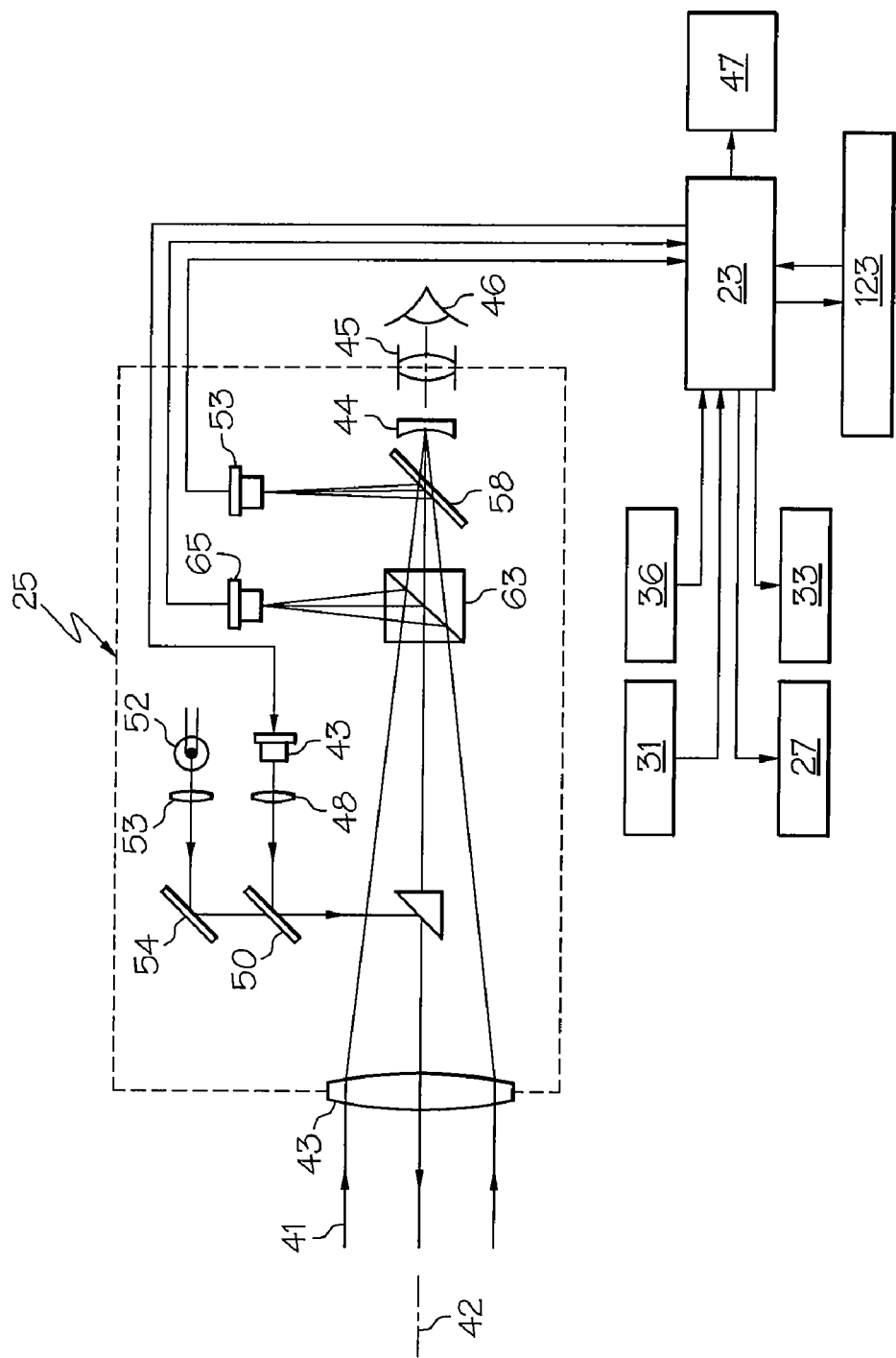
FIG. 2 is a functional diagram of a surveying instrument shown in FIG. 1.

A functional diagram of the measuring system 25 is illustrated in FIG. 2. The measuring system 25 comprises a telescope and a distance measuring system, both using common optical elements in their beam paths. Light 41 emitted from a scenery enters the optical system 25 through an objective lens 43, and an image of the scenery is generated by further optical components, such as schematically indicated at 44 in FIG. 2, and can be observed by an eye 46 of a user looking into an ocular 45.

The optical system 25 further comprises a distance measuring system comprising a light emitting element 49, such as an infrared LED, a condensing lens 48 for condensing distance measuring light emitted by the light emitting element 49, a dichroitic mirror 50 for reflecting the condensed light towards a reflection prism 51 such that the light is reflected through the objective lens 43 along an optical axis 42 extending through the objective lens 43 and focusing lens 44.

The optical system 25 further comprises an illumination unit comprising a light source 52, such as an LED, for emitting illumination light, a condensing lens 53 for condensing the illumination light emitted by the light source 52 in a direction towards the reflection prism 51 such that also the illumination light is emitted as a shaped beam through the objective lens 43 along the optical axis 42.

Illumination light reflected from a target, such as a retro-reflecting prism, enters the optical system 25 through the objective lens 43, is reflected from a semi-transparent mirror 58 and is incident on a radiation detector 59 sensitive to position of light incident upon it, having four sector detector elements to generate a position signal supplied to the processing unit 29. The processing unit controls the motors 27 and 33 such that the position signal is optimized such that the four detector elements 59 receive a substantially equal light intensity. This indicates that the optical axis 42 representing a pointing direction of the distance measuring system is oriented to the reflecting target. The radiation detector 59 may be formed by any type of detector generating a signal which is indicative of a position of incident light intensity relative to the detector. Further examples of the radiation detector comprise a CCD detector or a position sensing detector such as a PSD detector obtainable from SiTek Electro Optics, 433 30 Partille, Sweden.

Distance measuring light generated by the light emitting element 49 and reflected from the target enters the optical system 25 through the objective lens 43 and is reflected from a dichroic prism 63 to be incident on a light receiving element 65 generating an output signal which is indicative of a distance of the measuring system 25 from the reflecting target. The distance from the target may be calculated by evaluating a phase difference between a light intensity emitted by the light emitting element 49 and an intensity received by the detector 65, or by any other optical distance measuring method well known in the art, such as a time-of-flight pulse distance measurement.

Figure 3:
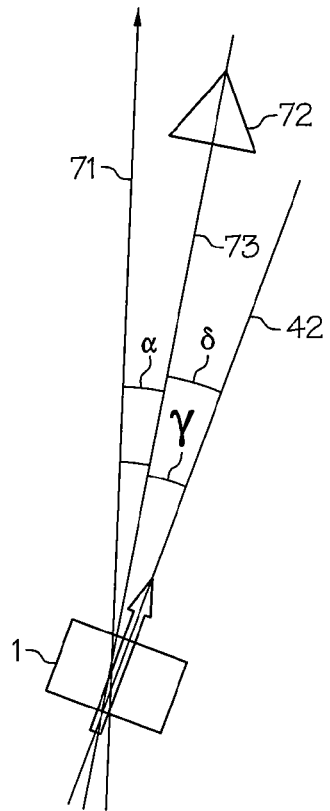
FIG. 3 schematically illustrates angles involved in a surveying method.

FIG. 3 is a top view of the surveying instrument 1 in an exemplary measuring situation. Arrow 71 represents an axis of a suitable coordinate system of the surveying instrument. For example, axis 71 may coincide with a horizontal direction towards the magnetic north. Reference numeral 72 schematically indicates a reflective target, such as a retro-reflecting prism. Line 73 represents a direction of the optical axis 42 in a situation when the optical system aims exactly at the target 72. Angle $\alpha$ represents the true horizontal angle between axis 71 and direction 73 to the target. In the situation illustrated in FIG. 3, where the optical system does not aim exactly at the target, an instrument angle $\gamma$ between the optical axis 42 or aiming direction of the optical system and the axis 71 differs from the angle $\alpha$ by an error angle $\delta$.

Figure 4:
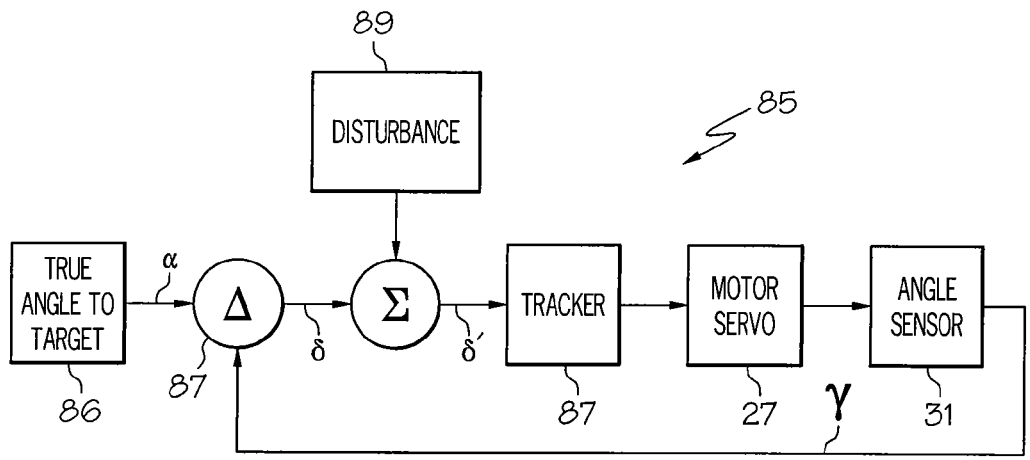
FIG. 4 schematically illustrates an idealized control loop for tracking a target using the surveying instrument illustrated in FIGS. 1 and 2.

FIG. 4 schematically illustrates an idealized control loop 85 for azimuthally tracking the target 72. The true angle $\alpha$ to the target indicated at 86 differs from the instrument angle $\gamma$ measured by the angle sensor 31 by a difference $\delta$ as indicated at 87. In an idealized situation, where air turbulence is not present, the difference angle $\delta$ would form a perfect error signal supplied to the tracking system indicated at 87. The tracking system 87 formed of the position detector 59 and control portions of the control circuit 29 may then control the motor 27 such that the input error signal $\delta$ becomes zero.

However, in a real measuring situation, a volume of turbulent air is traversed by the beam 42 of measuring light on its way from the optical system of the surveying instrument 1 to the target 72 and on its way back from the target 72 to the position detector 59 of the optical system 25. The turbulent air volume has regions of varying refractive index such that the beam path of the measuring light to the target 72 and back from the target 72 deviates from the ideal straight line. Therefore, the position detector will detect a disturbed error signal $\delta'$ which differs from the true error signal $\delta$. The disturbed error signal $\delta'$ is then used as the input signal of the tracking system which tries to control the motor 27 such that the disturbed error signal $\delta'$ forming the input to the tracking system will be reduced to zero.

Thus, the true error angle $\delta$, which is the difference between the instrument angle $\gamma$ and the true angle $\alpha$ to the target varies about a value of zero. Plural readings of the instrument angle $\gamma$ will vary about the true angle $\alpha$ to the target such that an average over an infinite number of readings of the angle $\gamma$ is equal to the true angle $\alpha$ to the target.

It is apparent that the true angle $\alpha$ to the target can only be determined to a limited accuracy by averaging over a limited number of readings of the instrument angle $\gamma$ obtained during a finite measuring period.

In other words, the measuring period during which readings of the instrument angle $\gamma$ are obtained, can be chosen such that a measuring result for the true angle $\alpha$ to the target has a desired accuracy.

The measuring period is determined from the disturbed error angle $\delta'$ detected by the position detector 59. The values of the angle $\delta'$ show a variability and are statistically scattered about the value of zero due to the operation of the control loop and the disturbance indicated at 89 generated by the air turbulence. Due to the statistical behavior of the disturbed error angle $\delta'$, a relative variability of the angle values $\delta'$ decreases with increasing measuring periods, wherein a rate of such decrease is greater in situations of reduced air turbulence as compared to situations of increased air turbulence. The variability can be evaluated by a mathematical method, such as determining the standard error of the angle values $\delta'$. The control circuit may perform, through a suitable software portion running on a processor of the control circuit 29, a continuous calculation of the standard error of the angle values $\delta'$ accumulated during a measuring period. If the calculated standard error becomes less than a predetermined threshold, the measuring period is terminated, and it is determined that the readings of the instrument angle $\gamma$ obtained during the measuring period is sufficient for determining the true angle $\alpha$ to the target to a sufficient accuracy by averaging the obtained angle values $\gamma$.

Thus, an adaptive method of measuring the angle $\alpha$ is provided wherein a measuring period used for accumulating measuring data is adapted to environment conditions involving varying degrees of air turbulence. The total measuring time is reduced in situations of a low degree of air turbulence, wherein the measuring time is sufficiently long to obtain accurate measuring results also in situations of relatively high degrees air turbulence.

The control loop illustrated above with reference to FIG. 4 allows tracking the target in the azimuthal direction. A similar control loop can be provided for tracking the target in an elevational direction, based on readings from the position sensor. Thus, the direction to the target can be determined with a high accuracy both in the azimuthal direction and the elevational direction.

Figure 5:
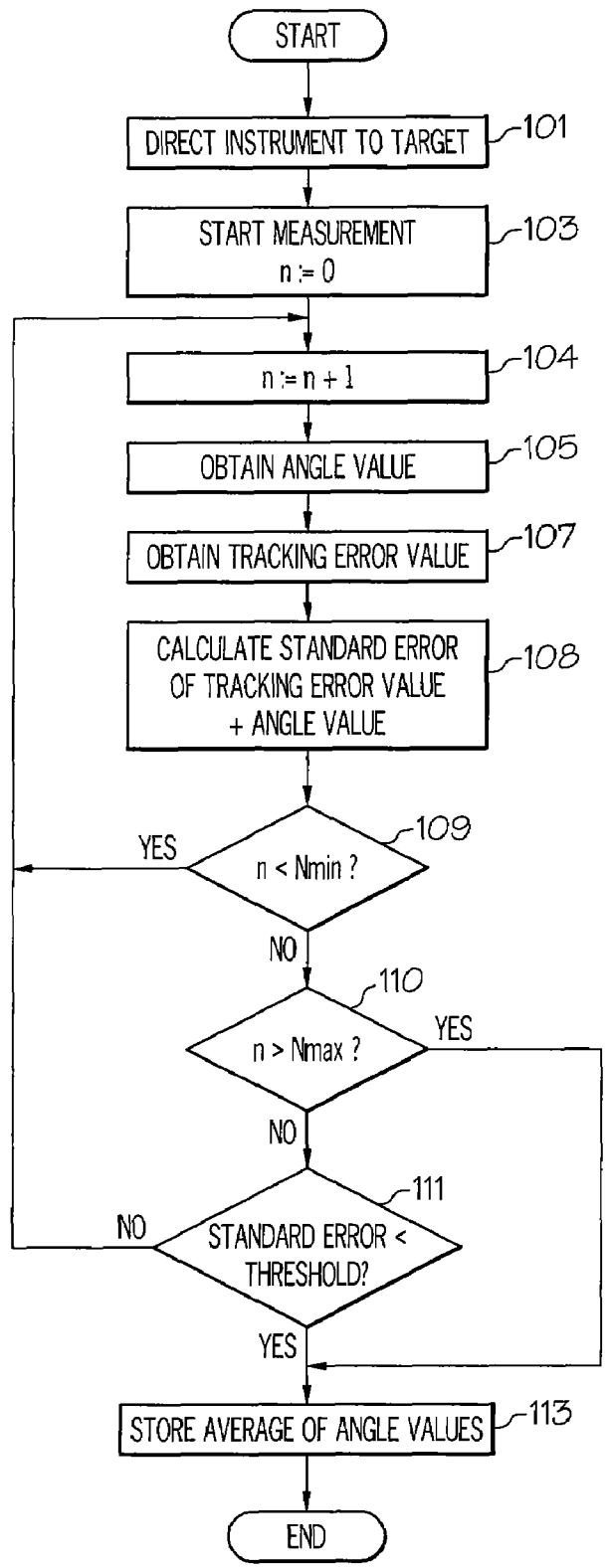
FIG. 5 is a flowchart illustrating a surveying method according to an embodiment of the invention.

A further embodiment of a surveying method will be illustrated by reference to the flow chart of FIG. 5 below. After start of the procedure, a user, looking through the ocular 45, directs the optical system to the target in a step 101 such that the position detector 59 detects the beam of measuring light reflected from the target. As soon as this light is incident on the position detector 59, the tracking system can start to perform a control loop similar to that shown in FIG. 4. The user may then start the measuring period for accumulating measuring data in a step 103 by providing a suitable input to a user interface of the processing unit 29. For example, the user may push a button provided on the housing of the surveying instrument or by touching a predefined region of the display 47 if the display has a touch screen functionality. A sample counter n is set to zero.

While the step 101 as illustrated above requires a user to look through the ocular 45 for directing the optical system to the target, it is also possible to implement an auto-seek functionality in which the motor arrangements 27, 33 are automatically driven to move the optical axis in the azimuthal direction and elevational direction until light reflected from the target indicates that the target has been found.

The processing unit 29 then increments the sample counter n in a step 104 and obtains a reading of an angle value from the angle sensors 31, 36 in a step 105. The processing unit also obtains a reading of the position signal provided from the position detector 59. If the position signal indicates a deviation in the azimuthal direction, the processing unit controls the motor 27 to reduce this deviation, and if the position detector indicates a deviation in the elevational direction, the processing unit operates the motor 33 to reduce that deviation. Further, the processing unit calculates a suitable error signal value indicating an amount of the deviation both in the azimuthal and elevational directions in a step 107, for example by adding the squares of each of the azimuthal deviation and the elevational deviation.

In addition to the error signal value obtained from the position signal of the tracking system, the processing unit also obtains an error signal value from angle signals generated by the angle measuring system. The processing unit combines the error signal values obtained from the tracking system and the angle measuring system to form a combined error signal value which is further processed by calculating a standard error of the combined error signal values in a step 109. Further, also the average of the angle values is calculated in step 109.

For example, the error signal value and the angle signal value can be combined by adding the values. Herein, the values can be suitably scaled before calculating the sum. For example, each error signal value and angle signal value may be scaled such that they represent corresponding angular amounts of deviation of the instrument angle γ from the true angle α. It is also possible to combine the unscaled error signal value and the unscaled angle signal value, or to scale only one of the error signal value and the angle signal value.

For example, the average of the angle values can be calculated based on the following formula $$\overline{X}_n = \frac{(n-1)}{n} \cdot \overline{X}_{n-1} + \frac{x_n}{n} \qquad \text{Equation (1)}$$

wherein
$\overline{X}$ represents the average and
$X_n$ indicates the currently obtained angle value.

The average of the combined error signal value can be obtained by applying equation (1) above to the currently calculated combined error signal value.

For example the values $X_n$ of Equation (1) may be obtained by the following formula:

$$x_n = a \cdot y_n + b \cdot z_n \qquad \text{Equation (2)}$$

wherein
$y_n$ represents the currently obtained angle value,
$Z_n$ represents the currently obtained position signal from the tracking system, and
a and b represent suitable scaling factors.

Thereafter, the variance $v_n$ of the combined error signal values is calculated by applying the following formula $$v_n = \frac{1}{(n-1)}\left(v_{n-1} \cdot (n-2) + \frac{n(\overline{X}_n - x_n)^2}{(n-1)}\right). \qquad \text{Equation (3)}$$

The standard error, (standard error of the mean, SEM) can than be calculated by $$e_n = \sqrt{\frac{v_n}{n}}. \qquad \text{Equation (4)}$$

In a step 108, a decision is made whether a minimum number $N_{min}$ of measurements has been taken. The minimum number $N_{min}$ may be preset in a memory 123 of the processing unit, or the minimum number $N_{min}$ may be settable by the user through the user interface.

If the minimum number of measurements has been accumulated, the processing continues at a step 110 in which a decision is made whether a maximum number of measurements has been taken, to ensure that the measuring of the angle does not take more than a maximum time. The number $N_{max}$ may be preset or user settable. If the sample counter n is below the maximum number $N_{max}$, the processing unit compares the calculated standard error with a predetermined threshold in a step 111. If the standard deviation is above the threshold, the processing is continued at step 105 for obtaining further measuring data and repeating steps 105, 107, 109, 111. If the standard deviation is below the threshold in step 111, the processing is continued at a step 113 which terminates the measuring period assuming that a sufficient number of readings of the angle value γ is obtained for determining the true angle α to the target with a sufficient accuracy by averaging the angle values. The thus obtained value of the angle to the target is stored in the memory of the processing unit for further analysis.

The threshold may be predefined or settable by the user. Still further, the threshold may depend on a distance of the tacheometer from the target, for example by dividing a constant value, which can be pre-stored or user settable, by such distance. In such situation, the constant c would correspond to a distance error in millimeters at a location of the target. The measurement will then be terminated in step 101 if the achieved accuracy of the determined angle corresponds to an accuracy in terms of millimeters at the location of the target.

Thereafter the procedure is terminated and can be started again for measuring angles to other targets or to repeat the measurement to the same target.

In the above illustrated embodiment, the measuring period is terminated based on readings of the azimuthal error signal, the elevational error signal, the azimuthal angle signal and the elevational angle signal. It should be noted that any other combination of these signals may be used as a basis for terminating the measuring period. For example, the termination may be based on the azimuthal and elevational error signals without considering the azimuthal or elevational angle signals, the termination may be based on the azimuthal and elevational angle signals without considering the azimuthal and elevational error signals, or the termination may be based on only one of the azimuthal and elevational error signals and only one of the azimuthal and elevational angle signals.

In the above illustrated embodiments, the standard error is used as a concept for characterizing the variability of the obtained measuring values. It is, however, possible to use other concepts of determining the variability, such as the more general concept of the moment of a distribution, wherein the standard error corresponds to the second moment. Thus, moments of other orders than two can be used for characterizing the variability.

To summarize, embodiments of a surveying instrument and method determine a duration of a measuring period for obtaining readings of angle values of an angle measuring system in dependence upon readings of an error signal produced by a tracking system. It is thus possible to determine a value of the angle represented by the readings of the angle signal with a desired accuracy in the presence of air turbulence wherein the measuring period is shorter at low degrees of air turbulence and longer at higher degrees of air turbulence.

While the invention has been described with respect to certain exemplary embodiments thereof, it is evident that many alternatives, modifications and variations will be apparent to those skilled in the art. Accordingly, the exemplary embodiments of the invention set forth herein are intended to be illustrative and not limiting in any way. Various changes may be made without departing from the spirit and scope of the present invention as defined in the following claims.

What is claimed is:

1. A surveying instrument comprising:
   a base;
   an optical system rotatably mounted relative to the base;
   at least one motor for controlling an orientation of the optical system relative to the base;
   an angle measuring system for measuring the orientation of the optical system relative to the base;
   a tracking system for controlling the at least one motor such that the optical system is directed to a target; and
   a processing unit configured
      to repeatedly obtain readings of at least one angle signal produced by the angle measuring system during a measuring period,
      to repeatedly obtain readings of at least one error signal produced by the tracking system during the measuring period,
      to terminate the measuring period based on a plurality of readings of the at least one error signal obtained during the measuring period, and
      to calculate an angle value based on a plurality of readings of the at least one angle signal obtained during the measuring period.

2. The surveying instrument according to claim 1, wherein the processing unit is further configured to terminate the measuring period based on a plurality of readings of the at least one angle signal obtained during the measuring period.

3. The surveying instrument according to claim 2, wherein the processing unit is configured to calculate a sum of an amount which is indicative of an angle value of a reading of the angle signal and an amount which is indicative of an error value of a reading of the error signal.

4. A surveying instrument comprising:
   a base;
   an optical system rotatably mounted relative to the base; at least one motor for controlling an orientation of the optical system relative to the base;
   an angle measuring system for measuring the orientation of the optical system relative to the base;
   a tracking system for controlling the at least one motor such that the optical system is directed to a target; and
   a processing unit configured
      to repeatedly obtain readings of at least one angle signal produced by the angle measuring system during a measuring period,
      to terminate the measuring period based on a plurality of readings of the at least one angle signal obtained during the measuring period, and
      to calculate an angle value based on a plurality of readings of the at least one angle signal obtained during the measuring period.

5. The surveying instrument according to claim 4, wherein the processing unit is configured to terminate the measuring period based on a variability of angle signal values of the plurality of readings of the at least one angle signal.

6. The surveying instrument according to claim 5, wherein the processing unit is configured to terminate the measuring period based on a standard error of the angle signal values.

7. The surveying instrument according to claim 4, wherein the optical system comprises a radiation detector sensitive to position of light incident upon it.

8. The surveying instrument according to claim 7, wherein the tracking system is configured to control the at least one motor based on an output signal of the radiation detector.

9. The surveying instrument according to claim 8, wherein the tracking system is configured to generate the error signal based on an output signal of the radiation detector.

10. The surveying instrument according to claim 9, wherein the error signal is indicative of an angular difference between an actual orientation of the optical system relative to the base and an orientation of the optical system relative to the base such that the optical system is directed to the target.

11. The surveying instrument according to claim 4, wherein the optical system comprises a light source and at least one lens for generating a shaped beam of light emitted from the optical system.

12. The surveying instrument according to claim 11, wherein the tracking system is configured to control the at least one motor such that the shaped beam of light is directed to the target.

13. The surveying instrument according to claim 4, wherein the processing unit is configured to terminate the measuring period based on a variability of error signal values of the plurality of readings of the error signal.

14. The surveying instrument according to claim 13, wherein the processing unit is configured to terminate the measuring period based on a standard error of the error signal values.

15. The surveying instrument according to claim 14, wherein the processing unit is configured to terminate the measuring period when the variability of the error signal values is below a predetermined threshold.

16. The surveying instrument according to claim 15, further comprising a user interface for inputting the predetermined threshold.

17. The surveying instrument according to claim 16, wherein each reading of the error signal is indicative of at least one angular value associated with a difference between an actual orientation of the optical system relative to the base and an orientation of the optical system relative to the base such that the optical system is directed to the target.

18. The surveying instrument according to claim 17, wherein the optical system comprises a distance measuring system for measuring a distance from the target, and wherein the processing unit is further configured to terminate the measuring period based on at least one reading of a distance signal produced by the distance measuring system.

19. The surveying instrument according to claim 18, further comprising a swivel arrangement mounting the optical system relative to the base, wherein the swivel arrangement defines a first axis of rotation of the optical system relative to the base.

20. The surveying instrument according to claim 19, wherein the at least one motor comprises a first motor for rotating the optical system about the first axis of rotation.

21. The surveying instrument according to claim 20, wherein the swivel arrangement defines a second axis of rotation of the optical system relative to the base, wherein the second axis of rotation is oriented substantially orthogonal to the first axis of rotation.

22. The surveying instrument according to claim 21, wherein the at least one motor comprises a second motor for rotating the optical system about the second axis of rotation.

23. The surveying instrument according to claim 22, wherein the error signal is indicative of at least one of a tracking error in an azimuthal direction and a tracking error in an elevational direction.

24. A surveying method of determining an orientation relative to a target, the surveying method comprising:
   starting a measuring period;
   repeatedly obtaining readings of an angle signal produced by an angle measuring system during the measuring period;
   repeatedly obtaining readings of an error signal produced by a tracking system during the measuring period;
   terminating the measuring period based on obtained readings of the error signal; and
   determining the orientation based on obtained readings of the angle signal obtained during the measuring period.

25. The surveying method according to claim 24, wherein the terminating of the measuring period is further based on obtained readings of the angle signal.

26. A surveying method of determining an orientation relative to a target comprising:
   starting a measuring period;
   repeatedly obtaining readings of an angle signal produced by an angle measuring system during the measuring period;
   terminating the measuring period based on obtained readings of the angle signal; and
   determining the orientation based on obtained readings of the angle signal obtained during the measuring period.

27. The surveying method according to claim 26, wherein the terminating of the measuring period comprises determining a variability of error signal values of the plurality of readings of the error signal.

28. The surveying method according to claim 27, wherein the measuring period is terminated when the variability is below a predetermined threshold.

29. The surveying method according to claim 28, wherein the predetermined threshold is settable by a user.

30. The surveying method according to claim 26, wherein the determining of the orientation comprises averaging of angle signal values of the plurality of readings of the angle signal.

* * * * *